United States Patent
Aramaki et al.

(10) Patent No.: US 12,237,102 B2
(45) Date of Patent: Feb. 25, 2025

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Miyu Aramaki, Mie (JP); Housei Mizuno, Mie (JP); Kyousyou Kou, Mie (JP); Hiroshi Murakami, Mie (JP); Tansinghoe Vincent, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 166 days.

(21) Appl. No.: 17/923,762

(22) PCT Filed: May 7, 2021

(86) PCT No.: PCT/JP2021/017491
§ 371 (c)(1),
(2) Date: Nov. 7, 2022

(87) PCT Pub. No.: WO2021/241164
PCT Pub. Date: Dec. 2, 2021

(65) Prior Publication Data
US 2023/0187103 A1    Jun. 15, 2023

(30) Foreign Application Priority Data
May 25, 2020   (JP) ................................ 2020-090614

(51) Int. Cl.
*H01B 7/40*  (2006.01)
*B60R 16/02* (2006.01)
*H01B 7/08*  (2006.01)

(52) U.S. Cl.
CPC ............ *H01B 7/40* (2013.01); *B60R 16/0215* (2013.01); *H01B 7/0846* (2013.01); *H01B 7/08* (2013.01)

(58) Field of Classification Search
CPC .......... H01B 7/08; H01B 7/0846; H01B 7/40; H01B 7/0045; B60R 16/0207;
(Continued)

(56) References Cited

U.S. PATENT DOCUMENTS 5,502,287 A * 3/1996 Nguyen ............... H01B 7/0846
                                                  174/117 A
5,543,196 A * 8/1996 Robinson ............... A01K 1/007
                                                  160/390

(Continued)

FOREIGN PATENT DOCUMENTS

JP   2013-127866   6/2013
JP   2016-100200   5/2016

(Continued)

OTHER PUBLICATIONS

International Search Report issued in International Patent Application No. PCT/JP2021/017491, dated Jul. 6, 2021, along with an English translation thereof.

(Continued)

*Primary Examiner* — Paresh Paghadal
(74) *Attorney, Agent, or Firm* — Greenblum & Bernstein, P.L.C.

(57) ABSTRACT

A wiring member includes: a wiring body including a base member and a normal wire fused to the base member; and a special wire fixed to the wiring body via a fixing part. The (Continued)

fixing part is fixed in a fixing state different from fusion between the base member and the special wire.

4 Claims, 6 Drawing Sheets

(58) Field of Classification Search
CPC ........ B60R 16/0215; H02G 3/04; H02G 3/30; H02G 3/32
See application file for complete search history.

(56) References Cited

U.S. PATENT DOCUMENTS

2020/0203037 A1* 6/2020 Yamaguchi .......... H02G 3/0456
2021/0035712 A1 2/2021 Mizuno et al.

FOREIGN PATENT DOCUMENTS

JP      2019-175579       10/2019
JP      2020-036523        3/2020
WO    WO-2019044122 A1 *  3/2019  ......... B60R 16/0215

OTHER PUBLICATIONS

International Preliminary Report on Patentability issued in International Patent Application No. PCT/JP2021/017491, dated Dec. 8, 2022, along with an English translation thereof.
Japan Office Action issued in Japan Patent Application No. 2020-90614, dated Aug. 1, 2023, together with English translation thereof.
Japan Office Action issued in Japan Patent Application No. 2023-166687, dated Jun. 18, 2024, together with English translation thereof.

* cited by examiner

WIRING MEMBER

TECHNICAL FIELD

The present disclosure relates to a wiring member.

BACKGROUND ART

Patent Document 1 discloses a technique of fixing a collected wire such as a twisted wire to a base member.

PRIOR ART DOCUMENTS

Patent Document(s)

Patent Document 1: Japanese Patent Application Laid-Open No. 2020-36523

SUMMARY

Problem to be Solved by the Invention

A condition appropriate to fuse a special wire such as a twisted wire to a base member is different from a condition appropriate to fuse a normal wire such as a single core wire to the base member in many cases. Thus, the normal wire such as a single core wire and a special wire such as a twisted wire are hardly fused to the base member collectively.

Accordingly, an object is to provide a technique capable of simply fixing a normal wire and a special wire to a base member.

Means to Solve the Problem

A wiring member according to the present disclosure is a wiring member including: a wiring body including a base member and at least one normal wire fused to the base member; and a special wire fixed to the wiring body via a fixing pan, wherein the fixing part is fixed in a fixing state different from fusion between the base member and the special wire.

Effects of the Invention

According to the present disclosure, the normal wire and the special wire can be simply fixed to the base member.

DESCRIPTION OF EMBODIMENT(S)

[Description of Embodiment of Present Disclosure]

Figure 1:
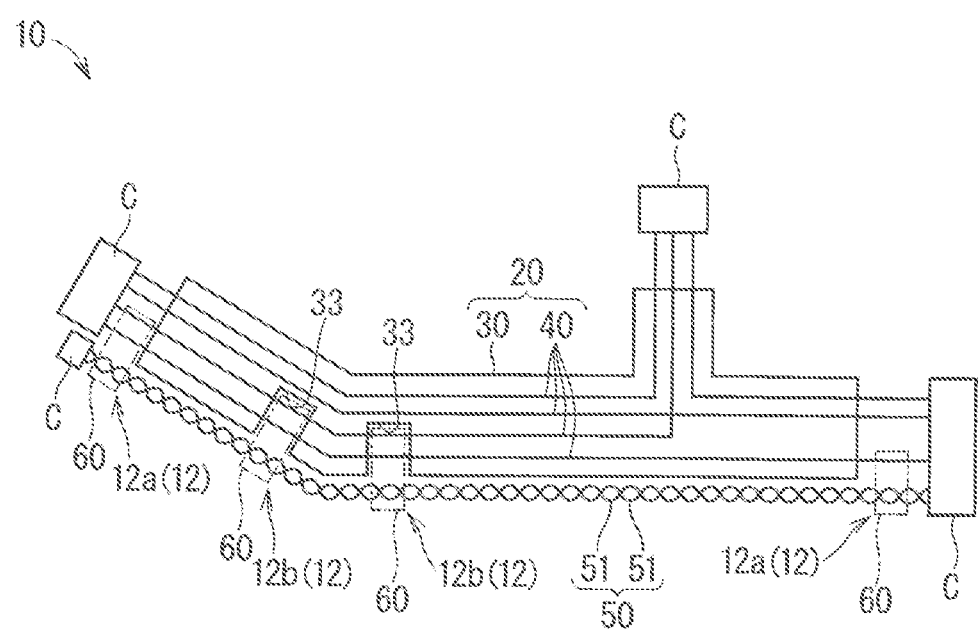
FIG. 1 is a schematic plan view illustrating a wiring member according to an embodiment 1.

Embodiments of the present disclosure are listed and described firstly.

A wiring member according to the present disclosure is as follows.

(1) A wiring member includes: a wiring body including a base member and at least one normal wire fused to the base member; and a special wire fixed to the wiring body via a fixing part, wherein the fixing pan is fixed in a fixing state different from fusion between the base member and the special wire. The fixing pan is fixed in the fixing state different from the fusion between the base member and the special wire, thus the normal w ire and the special wire can be simply fixed to the base member.

(2) In the wiring member according to (1), the fixing part may include a banding part in which the wiring body and the special wire are bound by a banding member. Accordingly, the special wire can be fixed without fusion.

(3) In the wiring member according to (2), the normal wire and the special wire may be bound by the banding member in the banding part. Accordingly, the special wire is fixed to the base member via the normal wire fixed to the base member.

(4) In the wiring member according to (3), it is applicable that a side edge of the base member is concaved, and a portion of the normal wire passing above a concave portion of the side edge of the base member is hound to the special wire. Accordingly, the special wire and the normal wire can be simply bound in an intermediate portion of the base member.

(5) In the wiring member according to (3) or (4), it is applicable that the plurality of normal wires are parallelly arranged, and some of the plurality of normal wires parallelly arranged are bound to die special wire. Accordingly, the special wire is fixed without winding the banding member around the whole wiring body.

(6) In the wiring member according to (2), the base member and the special wire may be bound by the banding member in the banding part. Accordingly, the special wire is fixed to the base member via the banding member.

(7) In die wiring member according to any one of (2) to (6), it is also applicable that a plurality of fusion parts between the base member and the normal wire are provided at intervals in a longitudinal direction of the normal wire, and the banding part is provided between the plurality of fusion parts. Accordingly, the special wire is fixed in a position of an intermediate portion of the base member.

(8) In the wiring member according to (1), it is also applicable that the base member is a first base member, and the fixing part includes a fixing part where a second base member different from the first base member and the special wire are fixed and a fixing part where the first base member and the second base member are fixed. Accordingly, the first base member in which the normal wire is fixed and the second base member in which the special wire is fixed are fixed, thus the special wire is fixed to the wiring body.

[Details of Embodiment of Present Disclosure]

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 2:
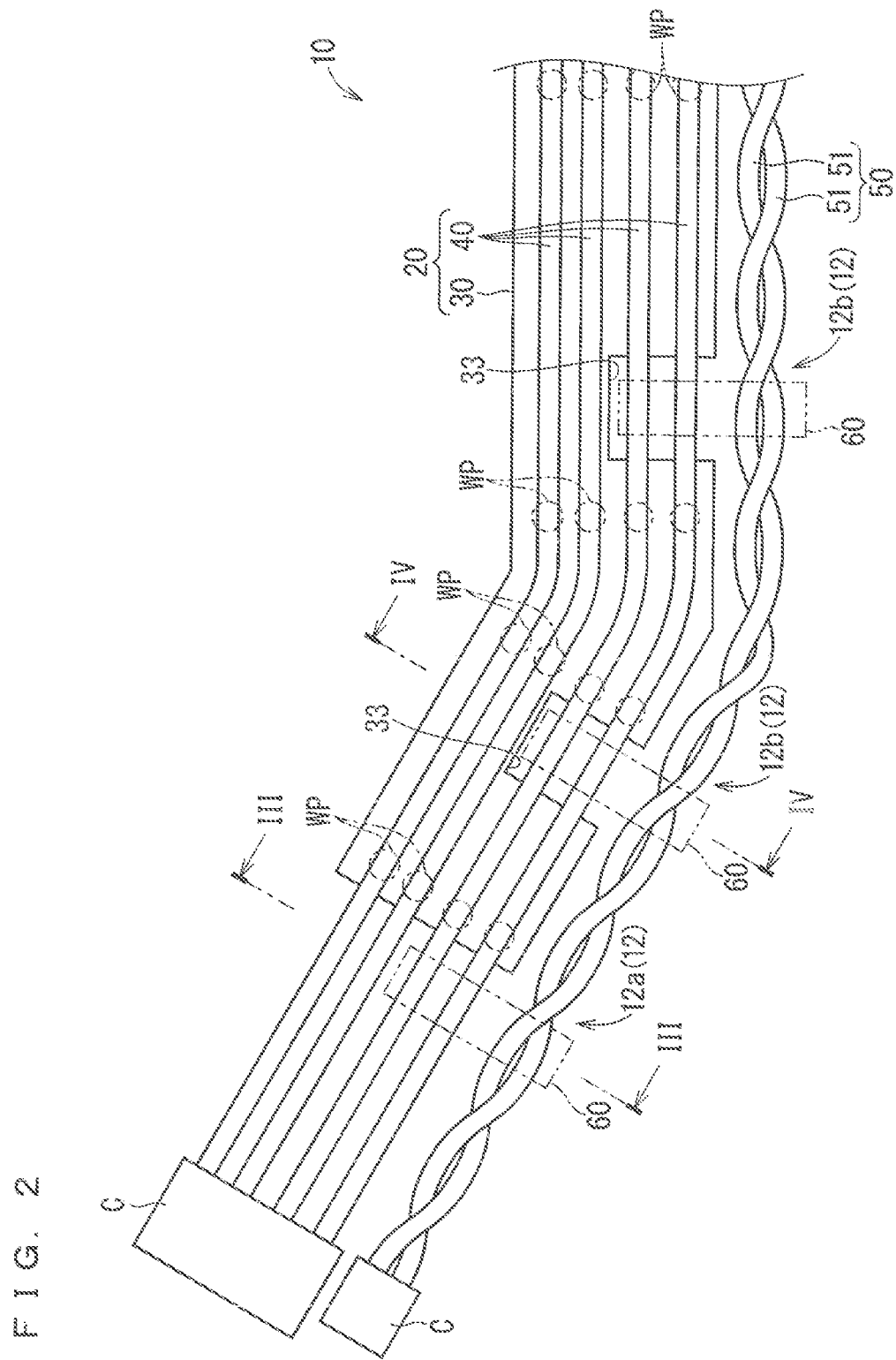
FIG. 2 is a partial enlarged view of FIG. 1.
Figure 3:
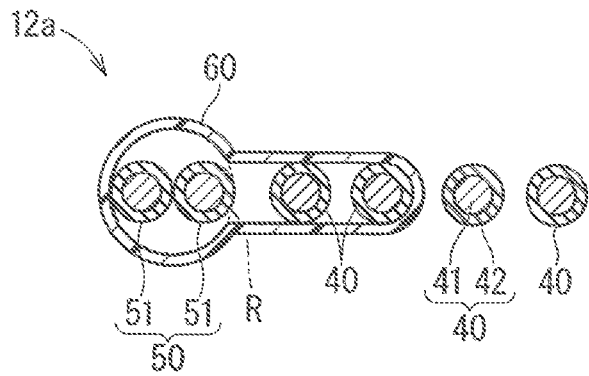
FIG. 3 is a cross-sectional view of the wiring member cut along a III-III line in FIG. 2.
Figure 4:
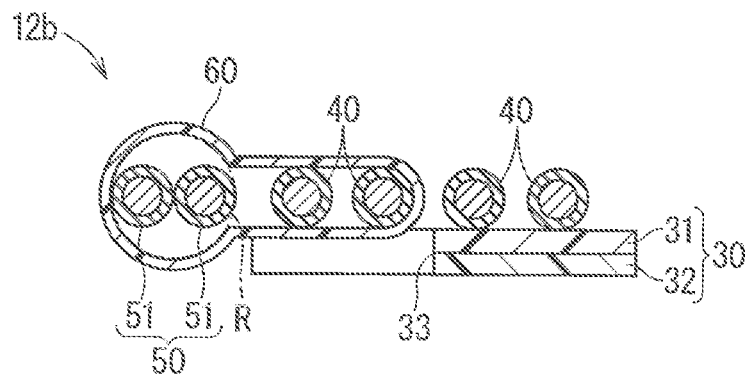
FIG. 4 is a cross-sectional view of the wiring member cut along a IV-IV line in FIG. 2.

A wiring member according to an embodiment 1 is described hereinafter. FIG. 1 is a schematic plan view illustrating the wiring member 10 according to the embodiment 1. FIG. 2 is a partial enlarged view of FIG. 1. FIG. 3 is a cross-sectional view of the wiring member 10 cut along a III-III line in FIG. 2. FIG. 4 is a cross-sectional view of the wiring member 10 cut along a IV-IV line in FIG. 2.

The wiring member 10 includes a wiring body 20 and a special wire 50. The wiring body 20 includes a base member 30 and a normal wire 40. The normal wire 40 is fused to the base member 30.

Any member is applicable as the base member 30 as long as it includes an arrangement surface on which the normal wire 40 is arranged. In the description hereinafter, the base member 30 is the sheet 30. The sheet 30 includes a fusion layer 31. The fusion layer 31 includes a resin material, or preferably includes a thermoplastic resin material. The resin material of the fusion layer 31 is softened and fused to a fusion target. A type of the resin material is not particularly limited, but polyvinyl chloride (PVC), polyethylene (PE), polypropylene (PP), or polyethylene terephthalate (PET) can be adopted, for example.

A structure of the fusion layer 31 is not particularly limited. For example, the fusion layer 31 may be a sheet having an evenly filled cross-sectional surface (also referred to as a non-foam sheet or a solid sheet, for example). The fusion layer 31 is also considered a foam sheet, tor example. The fusion layer 31 is also considered a fibrous material sheet such as a braided cloth, a woven cloth, or a non-woven cloth, for example.

The sheet 30 may also have a single layer structure made up of the fusion layer 31. The sheet 30 may also have a multilayer structure. When the sheet 30 has the multilayer structure, the fusion layer 31 is preferably located at least on one main surface of the sheet 30. Herein, the sheet 30 includes the fusion layer 31 and an additional layer 32. The normal wire 40 is fused to the fusion layer 31. One surface of the fusion layer 31 is one main surface of the sheet 30.

The additional layer 32 is formed of a material different from that of the fusion layer 31, or has a different structure. The additional layer 32 increases a function of the fusion layer 31, or adds a function which the fusion layer 31 does not have to the sheet 30. A material constituting the additional layer 32 is a material described for the fusion layer 31 described above or metal, for example. A structure of the additional layer 32 may be any of the structure described for the fusion layer 31 described above. One surface of the additional layer 32 is the other main surface of the sheet 30.

The fusion layer 31 and the additional layer 32 are fixed to each other while the other surface of the fusion layer 31 and the other surface of the additional layer 32 have contact with each other. A fixing state of the fusion layer 31 and the additional layer 32 is not particularly limited, however, fixing by fusion or adhesion is preferable. For example, when at least one of the fusion layer 31 and/or the additional layer 32 is a sheet having voids in a surface such as a fibrous material sheet or a foam sheet, a resin material or an adhesive agent enters the voids and the layers can be fixed to each other. Such a configuration causes so-called anchor effect, thus the fusion layer 31 and the additional layer 32 are rigidly fixed.

In the description herein, the fusion layer 31 is a solid sheet formed of resin and the additional layer 32 is a fibrous material sheet. In the description herein, the fusion layer 31 and the additional layer 32 are fused to each other. That is to say, the resin of the fusion layer 31 enters between the fibers of the additional layer 32 while having flowability, and is then hardened. Accordingly, a state where the resin of the fusion layer 31 enters between the fibers of the additional layer 32 is maintained, and the fusion layer 31 and the additional layer 32 are rigidly fixed.

The fusion layer 31 and the additional layer 32 are formed to have the same size (the same planar shape). One of the fusion layer 31 and the additional layer 32 may also be formed to be larger than the other one thereof. The fusion layer 31 and the additional layer 32 are wholly fixed at a region where they have contact with each other. The fusion layer 31 and the additional layer 32 may also be fixed only at a part of a region where they have contact with each other.

The sheet 30 may be a flexible member. For example, the fusion layer 31 is a resin layer having an evenly filled cross-sectional surface made up of flexible resin such as flexible PVC as a material, the additional layer 32 is a non-woven cloth made up of PET as a material, and the sheet 30 is a flexible member. For example, the sheet 30 may have a plastic property so as to be able to follow bending of the normal wire 40. That is to say, it is also applicable that the wring member 10 can be bended in a thickness direction (bending so that a fold line follows the main surface of the sheet 30).

The normal wire 40 is a wire-like member transmitting electrical power or light, for example. The sheet 30 is formed into a flat shape as a whole. The normal wire 40 is fixed to the sheet 30, thus the wiring body 20 is kept in a flat state. The special wire 50 is a wire-like member transmitting electrical power or light, for example. The special wire 50 is fixed to the flat wiring body 20, thus the wiring member 10 is kept in a flat state. The normal wire 40 and the special wire 50 transmitting the electrical power may be various kinds of signal lines or various kinds of power lines. Some of the normal wire 40 and the special wire 50 transmitting the electrical power may be used as an antenna or coil, for example, transmitting or receiving a signal or electrical power to or from a space.

Herein, the normal wire 40 is the single core wire 40, and the special wire 50 is the twisted wire 50. The single core wire 40 includes one core wire 41 and a covering layer 42 for covering the core wire 41. The core wire 41 is one conductive mute made up of one or a plurality of strands. The covering layer 42 is formed of a resin material extruded around the core wire 41 to cover it, for example. The twisted wire 50 is a plurality of stranded covering wires 51. FIG. 3 illustrates a twisted pair wire as a typical example of the twisted wire 50. Circular ranges R illustrated by alternate long and two short dashes lines in FIG. 3 indicate ranges of movement of the plurality of covering wires 51 in the twisted wire 50. The same applies to each drawing hereinafter.

A combination of the normal wire 40 and the special wire 50 is not limited thereto. For example, the special wire 50 may be a member fused to the sheet 30 more hardly than the normal wire 40. A state of being fused to the sheer 30 more hardly than the normal wire 40 indicates a ease where a member cannot be fused to the sheet 30 or a case where a member can be fused to the sheet 30 but it takes more trouble to fuse the member to the sheet 30 than the case of fusing the normal wire 40 to the sheet 30 or fusion strength between the member and the sheet 30 is lower than that between the normal wire 40 and the sheet 30 when they are fused in the same fusion condition. For example, when the special wire 50 includes more transmission route than the normal wire 40 or has a structure with a larger number of layers than the normal wire 40, the special wire 50 is fused to the sheet 30 more hardly than the normal wire 40. For example, reactive force at a time of pressing the special wire 50 in fusion is not uniformly performed by reason that a horizontal section shape of the special wire 50 is not uniform along a longitudinal direction thereof, thus is fused to the sheet 30 more hardly than the normal wire 40. For example, the covering layer of the special wire 50 is formed of a material fused to the sheet 30 more hardly than the covering layer 42 of the normal wire 40, thus is fused to the sheet 30 more hardly than the normal wire 40.

Herein, in the twisted wire 50, an arrangement order of the covering wires 51 is periodically changed along a longitudinal direction of the twisted wire 50. Thus, the twisted wire 50 on the sheet 30 includes a portion where the covering wires 51 in the twisted wire 50 are vertically stacked on the sheet 30 (referred to as a vertical arrangement portion hereinafter) and a portion where the covering wires 51 are laterally arranged on the sheet 30 (referred to a lateral arrangement portion hereinafter). Fusion strength in fusion to the sheet 30 may be different between the vertical arrangement portion and the lateral arrangement portion even when the fusion is performed in the same fusion condition. It takes a trouble to selectively fuse one of the vertical arrangement portion and the lateral arrangement portion in the twisted wire 50. Accordingly, the twisted wire 50 is fused to the sheet 30 more hardly than the single core wire.

The normal wire 40 and the special wire 50 are assumed to be members connecting components in a vehicle. A connector C, for example, is provided on an end portion of each of the normal wire 40 and the special wire 50. This connector C is connected to a connector provided in the other side component, thus the normal wire 40 and the special wire 50 are connected to the other side component. That is to say, the present wiring member 10 is used as wiring member 10 electrically connecting various types of component in a vehicle, for example (or connecting them so that they can perform optical communication). The connector C may be fixed to the sheet 30. In the example illustrated in FIG. 1, one end portion of the special wire 50 is incorporated into the same connector C the connector C into which the end portion of the normal wire 40 is incorporated. The other end portion of the special wire 50 is incorporated into a connector C different from the connector C into which the end portion of the normal wire 40 is incorporated. Both end portions of the special wire 50 may be incorporated into the same connector C as the connector C into which the end portion of the normal wire 40 is incorporated. Both end portions of the special wire 50 may be incorporated into a connector C different from the connector C into which the end portion of the normal wire 40 is incorporated.

A route of each of the normal wire 40 and the special wire 50 is set in accordance with a position of a component to which the normal wire 40 and the special wire 50 are connected. The normal wire 40 is fixed to the sheet 30, thus is kept in a form following a wiring route corresponding to a position of a component as a connection destination of the normal wire 40. The normal wire 40 may be fixed to the sheet 30 in a state where a branch wire is branched from a main wire. The sheet 30 may also be formed into a shape in which a portion to which the branch wire is fixed is branched from a portion to which the main wire is fixed. Herein, the normal wire 40 is branched on the sheet 30. The sheet 30 is branched in accordance with a branch shape of the normal wire 40. The special wire 50 is fixed to the wiring body 20, thus is kept in a form following a wiring route corresponding to a position of a component as a connection destination of the special wire 50.

In the example illustrated in FIG. 1, the special wire 50 extends along at least one normal wire 40 on a portion where the normal wire 40 is disposed on the sheet 30. The special wire 50 may extend in a direction different from the normal wire 40 on a portion where the normal wire 40 is disposed on the sheet 30. The special wire 50 may branch off from the other normal wire 40. For example, it is applicable that the normal wire 40 extends between the connector C located on a left side of a branch part and the connector C located on an upper side of the branch part on the sheet 30 in FIG. 1, and the special wire 50 extends between the connector C located on the left side of the branch part and the connector C located on a right side of the branch part.

A portion where the sheet 30 and the normal wire 40 are fused to each other is defined as a fusion part WP. Herein, the plurality of fusion parts WP are provided at intervals along the longitudinal direction of the normal wire 40. In the example illustrated in FIG. 1, the fusion part WP is provided on an end portion of a straight section (a boundary between the straight section and a curved line) and an end portion of the sheet 30. The fusion part WP is provided in an intermediate portion of the straight section when the straight section is long. In the example illustrated in FIG. 1, the fusion part WP is not provided in an intermediate portion of a curved section, but may be provided in the intermediate portion of the curved section. However, the fusion part WP may be provided sequentially from one end to the other end of the sheet 30 along the longitudinal direction of the normal wire 40.

A means of forming such a fusion state between the sheet 30 and the normal wire 40 is not particularly limited, however, adoptable are various types of fusion means such as ultrasonic fusion, heating pressurizing fusion, hot air fusion, and high-frequency fusion. When the fusion state is formed by these means, the fusion part WP is in a state of fusion fixation by those means. Specifically, when the fusion part WP is formed by ultrasonic fusion, the fusion part WP is an ultrasonic fusion part, for example.

A resin material of at least one of the sheet 30 an the normal wire 40 is melted and bonded to the other one of the sheet 30 and the normal wire 40, thus they are fused to each other. Resin materials of both the sheet 30 and the normal wire 40 are preferably melted, and the sheet 10 and the normal wire 40 are bonded and fused to each other. It is sufficient that a resin material constituting the fusion layer 31 and a resin material constituting the covering layer 42 are the same type of material. Both a resin material constituting the fusion layer 31 and a resin material constituting the covering layer 42 may be PVC, for example.

The special wire 50 is fixed to the wiring body 20 via a fixing part 12. The fixing part 12 is fixed in a fixing state different from fusion between the sheet 30 and the special wire 50. Herein, the fixing part 12 is the banding part 12. The banding part 12 is a portion where the wiring body 20 and the special wire 50 are bound by a banding member 60 and fixed to each other. Herein, the plurality of (four herein) fixing parts 12 are provided in the wiring member 10. All of four fixing parts 12 are the banding parts 12. Four fixing parts 12 may include a fixing part other than the banding part 12.

Herein, the normal wire 40 and the special wire 50 are bound by the banding member 60 in the banding part 12. The sheet 30 is not bound to the special wire 50 in the banding part 12. Only the normal wire 40 in the normal wire 40 and the shed 30 is bound to the special wire 50 in the banding part 12. Such a banding part 12 may be referred to as the normal wire banding part. Herein, all of four banding parts 12 are the normal wire banding parts. Four banding parts 12 may include the banding part 12 other than the normal wire banding part (for example, a base member banding part or a wiring body fixing part described hereinafter).

Any member is applicable as the banding member 60 as long as it can bind the wiring body 20 (the normal wire 40 herein) and the special wire 50. For example, the banding member 60 may be an adhesive tape or a banding band. The adhesive tape includes a base material layer and an adhesive layer, for example. The adhesive layer is stacked on one surface of the base material layer. The banding band includes a band part and a band fixing part, for example. The band fixing part is connected to a base end portion of the band part to be able to fix a tip end portion of the band part wound around a banding target. The banding band may be a banding band having the band part whose extension direction is regulated, thereby being able to be bound around the banding target in a flat posture. The banding band may be a normal banding band having the band part whose extension direction is not regulated. The banding member 60 may be wound to follow the circular range R as the range of movement of the covering wire 51 in the twisted wire 50.

A portion of the normal wire 40 extending to an outer side of the sheet 30 along the longitudinal direction of the sheet 30 is bound in two normal wire handing parts 12a in four normal wire banding parts 12. A portion of the normal wire 40 located in an intermediate portion of the sheet 30 along the longitudinal direction of the sheet 30 is hound in two normal wire banding parts 12b in four normal wire banding parts 12. The normal wire banding parts 12b are provided between the plurality of fusion parts WP. Four normal wire banding parts 12 include the normal wire banding parts 12a, 12b, 12b, and 12a arranged in this order from one end side to the other end side along the longitudinal direction of the special wire 50. The normal wire 40 and the special wire 50 extend in a straight form between each of two groups of normal wire banding parts 12a and 12b. A section where the normal wire 40 and the special wire 50 are bended is provided between two normal wire banding parts 12b. In the example illustrated in FIG. 1, the special wire 50 is located on an outer periphery side of the normal wire 40 in the section where the normal wire 40 and the special wire 50 are bended. The special wire 50 may be located on an inner periphery side of the normal wire 40 in the section where the normal wire 40 and the special wire 50 are bended. One normal wire banding part where the normal wire 40 and the special wire 50 are bound at the bended position may be provided in place of two normal wire banding parts 12b. That is to say, it is also applicable that the special wires 50 are bended to extend in an inner portion of the normal wire banding part, and the special wires 50 extend in direction intersecting with each other in one side and tire other side of the normal wire banding part.

The normal wire banding part 12b is provided in a position of a concave part 33 of the sheet 30. The concave part 33 is a portion where a side edge of the sheet 30 is concaved. Herein, the concave pan 33 is concaved to a portion overlapped with the normal wire 40 along a width direction of the sheet 30. Accordingly, a depth dimension of the concave part 33 is larger than a dimension from the normal wire 40 located closest to the side edge of the sheet 30 to the side edge thereof along the width direction of tire sheet 30. Herein, the concave pan 33 is concaved to a portion between the normal wires 40 along the width direction of the sheet 30. Accordingly, tire depth dimension of the concave part 33 is smaller than a dimension from the normal wire 40 located farthest from the side edge of the sheet 30 to the side edge thereof along the width direction of the sheet 30. A width dimension of the concave part 33 (a dimension along the longitudinal direction of the normal wire 40) is preferably equal to or larger than that of the handing member 60 (herein, an adhesive tape). A portion of the normal wire 40 passing above the concave part 33 of the sheet 30 is bound to the special wire 50 in the normal wire banding part 12. The banding member 60 passes through the concave part 33 to bind the normal wire 40 and the special wire 50.

The wiring member 10 includes a parallel section in which the plurality of normal wires 40 are parallelly arranged. The normal wire banding part 12 is provided in die parallel section. Some of the plurality of normal wires 40 parallelly arranged are bound to the special wire 50 in the parallel section. Some of the plurality of normal wires 40 parallelly arranged are bound to the special wire 50 in all of four normal wire banding parts 12. Such a normal wire banding part 12 may be referred to as a partial wire banding part. All of the plurality of normal wires 40 parallelly arranged may be bound to the special wire 50 in some or all of four normal wire banding parts 12. Such a normal wire banding part may also be referred to as a whole wire handing part.

One or a plurality of normal wires 40 may be bound in the normal wire banding part 12. When the plurality of normal wires 40 are bound in the normal wire banding part 12, an interval between the normal wires 40 in the normal wire banding part 12 may be the same as or smaller than that between the normal wires 40 on the sheet 30 (an interval between the normal wires 40 in a position where the fusion part WP is formed). It is also applicable that the normal wires 40 are arranged at intervals on the sheet 30 and the normal wires 40 have contact with each other in the normal wire banding part 12. The special wire 50 may have contact with the normal wire 40 adjacent to the special wire 50 or may also be away from the normal wire 40 in the normal wire handing part 12.

When the banding member 60 is an adhesive tape, a part of the adhesive tape (a portion wound on an upper side of the special wire 50 and the normal wire 40 in FIG. 3) and the other part of the adhesive tape (a portion wound on a lowerside of the special wire 50 and the normal wire 40 in FIG. 3) may be attached to each other between the special wire 50 and the normal wire 40 adjacent to the special wire 50. Accordingly, the special wire 50 and the normal wire 40 adjacent to the special wire 50 are kept away from each other. It is also applicable that a part of the adhesive tape and the other part of the adhesive tape are attached to each other in the similar manner between the normal wires 40, and the normal wires 40 are kept away from each other.

<Effect etc. of Embodiment 1>

According to the wiring member 10 having the above configuration, the fixing part 12 is fixed in a fixing state different from fusion between the sheet 30 and the special wire 50, thus the normal wire 40 and the special wire 50 can be simply fixed to the sheet 30.

The fixing part 12 includes the banding part 12 in which the wiring body 20 and the special wire 50 are bound by the banding member 60. Accordingly, the special wire 50 can be fixed to the wiring body 20 without fusion.

The normal wire 40 and the special wire 50 are bound by the banding member 60 in the banding part 12. Accordingly, tire special wire 50 is fixed to the sheet 30 via the normal wire 40 fixed to the sheet 30.

A portion of the normal wire 40 passing through the concave part 33 of the sheet 30 is bound to the special wire 50. Accordingly, the special wire 50 and the normal wire 40 can be simply bound in the intermediate portion of the sheet 30.

Some of the plurality of normal wires 40 parallelly arranged are bound to the special wire 50. Accordingly, the special wire 50 is fixed without winding the banding member 60 around the whole wiring body 20.

The banding part 12 is provided between the plurality of fusion parts WP. Accordingly, the special wire 50 is fixed in a position of the intermediate portion of the sheet 30.

Embodiment 2

Figure 5:
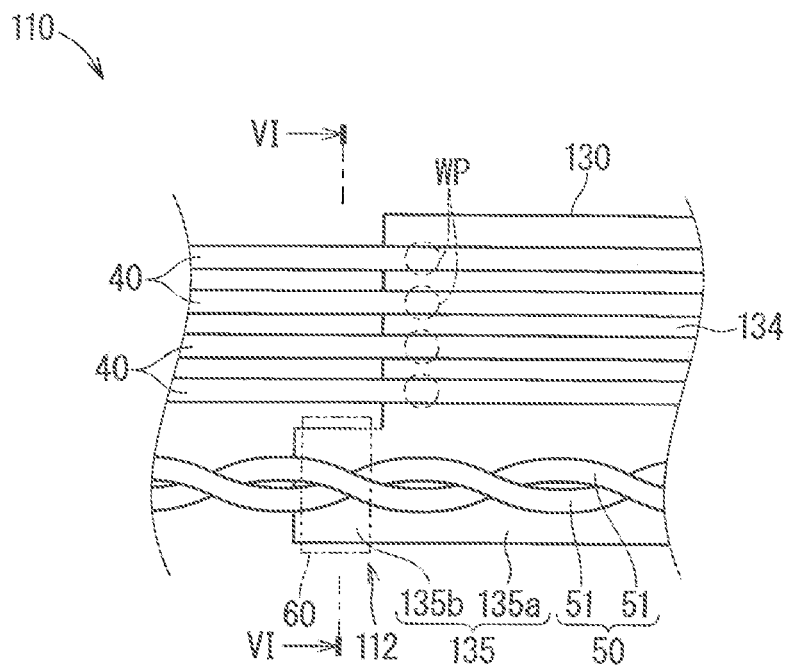
FIG. 5 is a schematic plan view illustrating a wiring member according to an embodiment 2.
Figure 6:
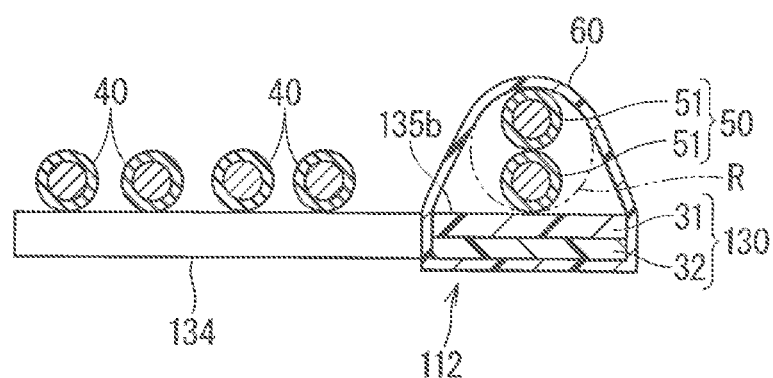
FIG. 6 is a cross-sectional view of the wiring member cut along a VI-VI line in FIG. 5.

A wiring member according to an embodiment 2 is described. FIG. 5 is a schematic plan view illustrating a wiring member 110 according to the embodiment 2. FIG. 6 is a cross-sectional view of the wiring member cut along a VI-VI line in FIG. 5. In the following description, the same reference numerals are assigned to the similar constituent elements described above, and the description thereof will be omitted.

A structure of a banding part 112 in the wiring member 110 is different from that of the handing part 12 in the wiring member 10. Specifically, the sheet 130 and the special wire 50 are bound by the banding member 60 in the banding part 112. Accordingly, the special wire 50 is fixed to the sheet 30 via the banding member 60.

The normal wire 40 is not bound to the special wire 50 in the banding part 112. Only the sheet 130 in the normal wire 40 and the sheet 130 is bound to the special wire 50 in the banding part 112. Such a banding part 112 may be referred to as the base member banding part 112.

A part for being bound to the special wire 50 by the banding member 60 is provided in the sheet 130. Specifically, the sheet 130 includes a normal wire arrangement part 134 and an extension part 135. The normal wire arrangement part 134 is a portion in which the normal wire 40 is disposed and fixed. The extension part 135 is a portion extending from the normal wire arrangement part 134. The normal wire 40 is not fixed to the extension part 135. Herein, the extension part 135 includes a lateral extension part 135*a* and a vertical extension part 135*b*. The lateral extension part 135*a* is a portion extending to a lateral side from the normal wire arrangement part 134. The vertical extension part 135*b* is a portion extending in a longitudinal direction of the lateral extension part 135*a* from the lateral extension part 135*a*. A side edge of the vertical extension part 135*b* is not connected to a side edge of the normal wire arrangement part 134. Herein, the special wire 50 is disposed on the extension part 135 of the sheet 130. The vertical extension part 135*b* of the extension part 135 is bound to the special wire 50. The lateral extension part 135*a* is sequentially located along the longitudinal direction of the normal wire arrangement part 134 in the sheet 130. The lateral extension part 135*a* may be provided in a plurality of positions at intervals along the longitudinal direction of the normal wire arrangement part 134. It is also applicable that the extension part is formed into a planar shape such as an L-like shape or a T-like shape having a lateral extension part and the vertical extension part to be partially provided along the longitudinal direction of the normal wire arrangement part 134.

The special wire 50 may not be disposed on the extension part 135 of the sheet 130 as a modification example described hereinafter.

Figure 7:
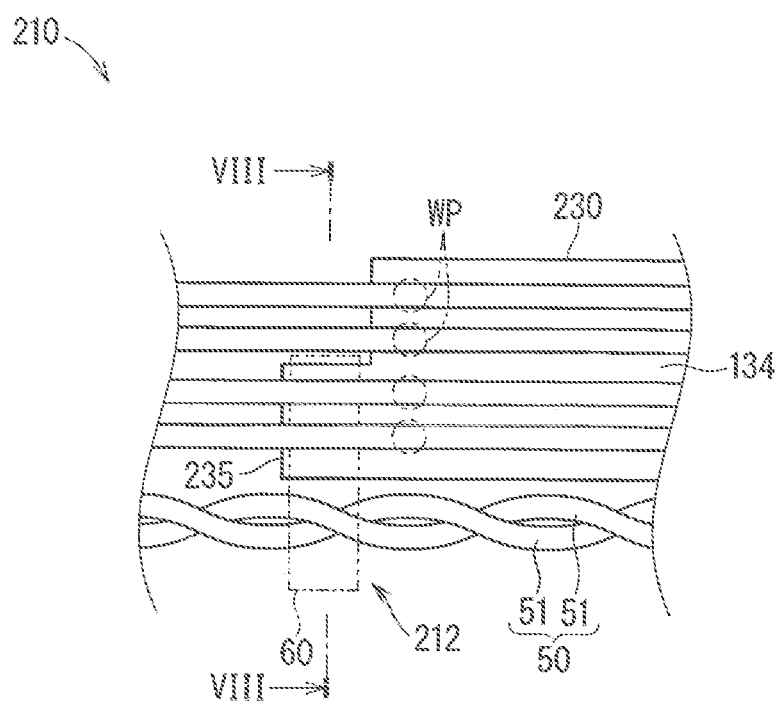
FIG. 7 is a schematic plan view illustrating a modification example of the wiring member according to the embodiment 2.
Figure 8:
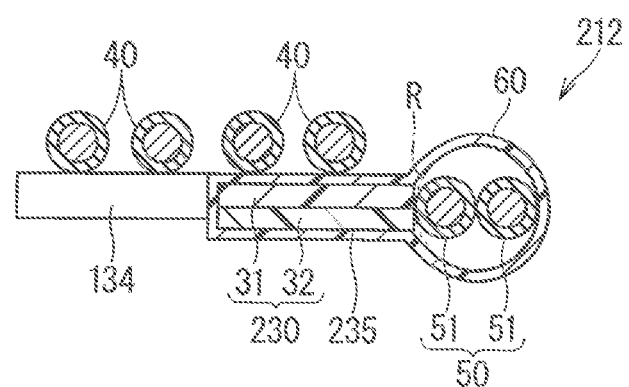
FIG. 8 is a cross-sectional view of the wiring member cut along a VIII-VIII line in FIG. 7.

FIG. 7 is a schematic plan view illustrating a modification example of the wiring member 110 according to the embodiment 2. FIG. 8 is a cross-sectional view of the wiring member 110 cut a VIII-VIII line in FIG. 7. The special wire 50 is not disposed on a sheet 230 in a wiring member 210 illustrated in FIG. 7. The special wire 50 is disposed on a lateral side of the sheet 230. A vertical extension part 235 of the sheet 230 extends in a longitudinal direction from an end portion of the normal wire arrangement part 134 in the longitudinal direction. The vertical extension part 235 is not fixed to the normal wire 40. The banding member 60 binds the vertical extension part 235 and the special wire 50 in the banding part 212. A part of the banding member 60 is located between the normal wire 40 and the vertical extension part 235. It is also applicable that the special wire 50 is disposed on a lateral side of the extension part 135 of the sheet 130, and the vertical extension part 135*b* is bound to the special wire 50 in the sheet 130 described above.

Embodiment 3

Figure 9:
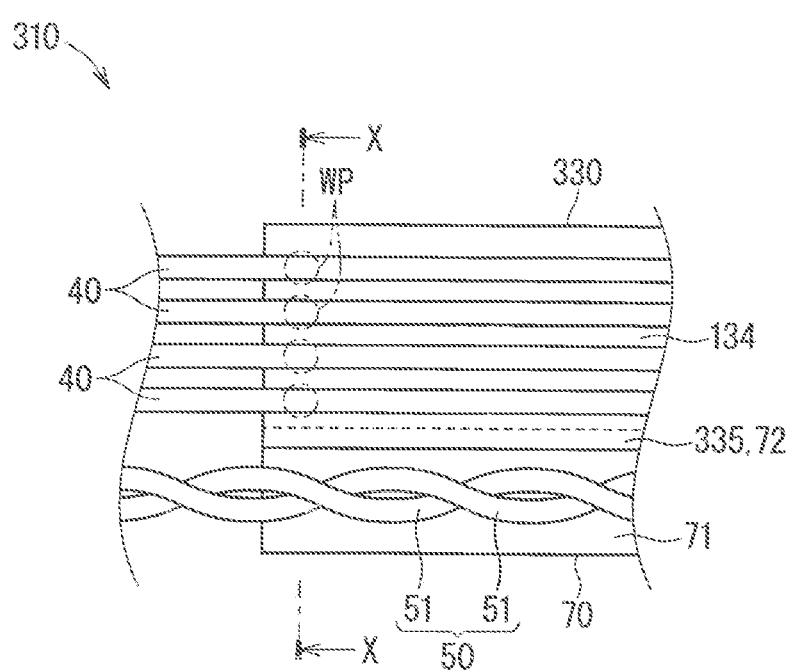
FIG. 9 is a schematic plan view illustrating a wiring member according to an embodiment 3.
Figure 10:
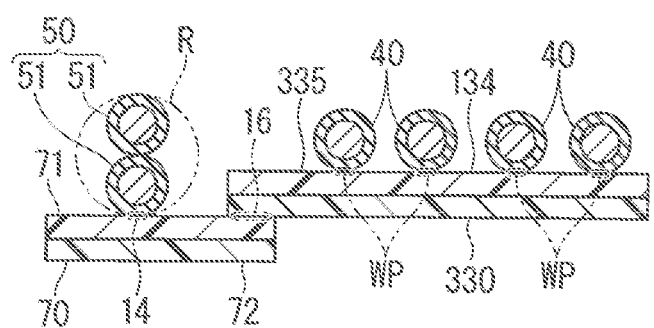
FIG. 10 is a cross-sectional view of the wiring member cut along an X-X line in FIG. 9.

A wiring member according to an embodiment 3 is described. FIG. 9 is a schematic plan view illustrating a wiring member 310 according to the embodiment 3. FIG. 10 is a cross-sectional view of the wiring member cut along an X-X line in FIG. 9.

The wiring member 310 is different from the wiring members 10, 110 and 210 described above in that the fixing parts 14 and 16 are not the banding parts 12, 112, and 212. Specifically, a sheet 330 in the wiring body 20 in the wiring member 310, that is to say, the sheet 330 to which the normal wire 40 is fused is the first sheet 330. The special wire 50 is fixed to a second sheet 70 different from the first sheet 330. The second sheet 70 is an example of the second base member. The fixing part 14 of fixing the second sheet 70 and the special wire 50 is referred to as the special wire fixing part 14. The first sheet 330 and the second sheet 70 are fixed to each other. A fixing part 16 of the first sheet 330 and the second sheet 70 is referred to as the base member fixing part 16. Accordingly, the fixing parts 14 and 16 in the wiring member 310 include the special wire fixing part 14 and the base member fixing part 16. In this manner, the first sheet 330 to which the normal wire 40 is fixed and the second sheet 70 to which the special wire 50 is fixed are fixed to each other, thus the special wire 50 is fixed to the wiring body 20.

A side edge of the first sheet 330 and a side edge of the second sheet 70 are preferably fixed to each other. The first sheet 330 includes the normal wire arrangement part 134 and a lateral extension part 335. The second sheet 70 includes a normal wire arrangement part 71 and a lateral extension part 72. The base member fixing part 16 is provided in a portion where the lateral extension part 335 and the lateral extension part 72 are overlapped with each other.

The special wire fixing part 14 and the base member fixing part 16 may have the same type or different types of fixing state. Any fixing state may be applied as the fixing state thereof. For example, the fixing state may be an adhesive part fixed via an intervention member such as an adhesive agent or a double-sided adhesive tape. For example, the fixing state may be a sewing part sewn with a thread. For example, the fixing state may be a locking part using a locking component such as a rivet or a stapler. For example, the fixing state may be a fusion part. Even in a case where a fusion part is adopted as the special wire fixing part 14, the special wire 50 is fused to the second sheet 70 different from the first sheet 30 to which the normal wire 40 is fused in the fusion part. Thus, the special wire 50 and the second sheet 70 can be fused in a fusion condition appropriate for the special wire 50 in the fusion part as the special wire fixing part 14. Thus the special wire 50 and the second sheet 70 can be simply fused to each other compared with a case where normal wire 40 and the special wire 50 are collectively fused to the first sheet 330.

[Additional Statement]

In the above description, the special wire 50 is the twisted wire 50, however, this configuration is not necessary. For example, the special wire 50 may be a coaxial wire, an ethernet (registered trademark) cable, or an optical fiber. For example, when the covering layer 42 of the normal wire 40 is made up of the same resin material as the fusion layer 31, the special wire 50 may be a single core wire having a covering layer made up of a material different from the fusion layer 31. For example, when the covering layer 42 of the fusion layer 31 and the normal wire 40 is PVC, the special wire 50 may be a single core wire having a covering layer other than PVC. In this case, the resin material constituting the covering layer of the special wire 50 is not particularly limited except for PVC, thus polyolefin such as PE and PP, silicone resin, or fluorine resin such as polytetrafluoroethylene, for example, is also applicable. The resin material may be halogen-free. A halogen-free state indicates that chlorine and bromine in halogen are nor contained or only a trace amount of halogen is contained. For example, in u standard of International Electrotechnical Commission (IEC), a case where a content rate of each of chlorine and bromine is equal to or smaller than 900 ppm and a total content rate of chlorine and bromine is equal to or smaller than 1500 ppm is defined as the halogen-free state. A halogen-free wire-like transmission member is also referred to as a zero-halogen wire (for example, a zero-halogen electrical wire in a case of an electrical wire).

In the description described above, the number of special wires 50 is one, however, the plurality of special wires 50 are also applicable. The plurality of special wires 50 may be disposed on only one side of the wiring body 20 as with the wiring member 10 described above. The plurality of special wires 50 may be separately disposed on both sides of the wiring body 20.

In the example described above, the banding part 12 is the normal wire banding part 12 or the base member banding part 112, however, the banding part 12 may bind both the normal wire 40 and the sheet 30 and the special wire 50. Such a banding part 12 may be referred to as the wiring body banding part. For example, when the wiring body 20 and the special wire 50 have a positional relationship illustrated in FIG. 7, the wiring body banding part may be made up of the vertical extension part 235, two normal wires 40 on the vertical extension part 235, and the special wire 50 bound by the banding member 60.

The configurations described in the embodiments and modification examples thereof can be appropriately combined as long as they are not contradictory.

EXPLANATION OF REFERENCE SIGNS

10, 110, 210, 310 wiring member
12, 12a, 12b, 112, 212 banding part (fixing part)
14 special wire fixing part (fixing part)
16 base member fixing part (fixing part)
20 wiring body
30, 130, 230 sheet (base member)
330 first sheet (first base member)
31 fusion layer
32 additional layer
33 concave part
134 normal wire arrangement part
135 extension part
135a, 335 lateral extension part
135b, 235 vertical extension part
40 normal wire
41 core wire
42 covering layer
50 special wire (twisted wire)
51 covering wire
60 banding member
70 second sheet (second base member)
71 special wire arrangement part
72 lateral extension part
WP fusion part
C connector

The invention claimed is:

1. A wiring member comprising:
a wiring body including a base member and at least one normal wire fused to the base member; and
a special wire fixed to the wiring body via a fixing part, wherein
the fixing part is fixed in a fixing state different from fusion between the base member and the special wire,
the fixing part includes a banding part in which the at least one normal wire of the wiring body and the special wire are bound by a banding member,
the at least one normal wire and the special wire are bound by the banding member in the banding part,
a side edge of the base member is concaved, and
a portion of the normal wire passing above a concave portion of the side edge of the base member is bound to the special wire.

2. The wiring member according to claim 1, wherein
a plurality of normal wires are parallelly arranged, and
some of the plurality of normal wires parallelly arranged are bound to the special wire.

3. The wiring member according to claim 1, wherein
the fixing part includes another banding part in which the base member and the special wire are bound by another banding member.

4. A wiring member comprising:
a wiring body including a base member and at least one normal wire fused to the base member; and
a special wire fixed to the wiring body via a fixing part, wherein
the fixing part is fixed in a fixing state different from fusion between the base member and the special wire,
the fixing part includes a banding part in which the at least one normal wire of the wiring body and the special wire are bound by a banding member,
a plurality of fusion parts between the base member and the normal wire are provided at intervals in a longitudinal direction of the normal wire, and
the banding part is provided between the plurality of fusion parts.

* * * * *